United States Patent [19]
Nicolai et al.

[11] 3,766,493
[45] Oct. 16, 1973

[54] HOLDING CLADDING FOR LASER SLABS

[75] Inventors: Van O. Nicolai, Reston, Va.; Harry W. Fox, Washington, D.C.

[73] Assignee: The United States of America as represented by the Secretary of the Navy, Washington, D.C.

[22] Filed: Sept. 26, 1972

[21] Appl. No.: 292,386

[52] U.S. Cl. .................................. 331/94.5, 330/4.3
[51] Int. Cl. ............................................. H01s 3/02
[58] Field of Search ..................... 331/94.5; 330/4.3

[56] References Cited
UNITED STATES PATENTS

| | | | |
|---|---|---|---|
| 3,621,456 | 11/1971 | Young | 331/94.5 |
| 3,628,172 | 12/1971 | Matovich et al. | 331/94.5 |
| 3,702,976 | 11/1972 | Young | 331/94.5 |
| 3,711,785 | 1/1973 | Zitkus | 331/94.5 |

*Primary Examiner*—William L. Sikes
*Attorney*—R. S. Sciascia et al.

[57] ABSTRACT

The invention disclosed in this application provides a unique cladding structure for holding laser disc elements structurally rigidly aligned and allows for release of stress produced by heating of the disc element. One unique material for this is "FEP" Teflon which is a Copolymer of Hexafluoropropylene and Tetrafluoroethylene in conjunction with ruby.

8 Claims, 7 Drawing Figures

PATENTED OCT 16 1973

3,766,493

HOLDING CLADDING FOR LASER SLABS

There has been defined a need for a laser delivering a 1 kilojoule per pulse, $\theta <$ milliradian, 1 percent efficiency, and with pulse lengths suitable both for range resolution and for long range imaging. A major limitation on the design of a kilojoule system is the pump intensity. It has been shown that above a pressure of 0.1 atmosphere the electron collision rate becomes so large that the electron temperature and the gas temperature become very nearly equal. As temperatures are increased by going higher currents and pressures, any spectral lines tend to broaden and disappear into the rising continuum, and the spectral distribution approaches a black body distribution. Thus a flash lamp with a spectral distribution close to that of a black body will give a higher ruby pumping rate than spectrally matched lamps. Black body temperatures higher than 9,000° K give only slightly increased ruby pumping and a lot more UV, resulting in less overall efficiency.

In order for a kilojoule pulse to be easily directed at a distant target it should be contained in a single coherent beam. A loss coefficient in active ruby of about 35 percent per meter prevents the use of amplifiers longer than about a meter; maximum ruby diameter currently available is about 4 inches. The resulting limit in cylindrical amplifier pumping area and the limitation in lamp intensity make pulse lengths less than 100 microseconds practical only for the storage mode of operation. With an artificial delay line matched to the lamp impedance the energy can be pumped in uniformly during a 1 millisecond pump time, stored, and then removed in either 100 nanoseconds for both range imaging and range resolution or removed in microseconds if only long range imaging with less chance of ruby damage is desired.

Low beam divergence requires that the ruby be uniformly pumped. Uniform pumping is achieved only when ruby doping densities are small enough to transmit 90 percent of the pump light through the ruby in a single pass. This 90 percent is reabsorbed by the lamps. Completely surrounding the ruby by flash lamps will give maximum pumping intensity but so much flash lamp wall area, through which heat is conducted, results in an inefficient system. With spaced lamps and interspaced reflectors the lamp wall area is reduced and efficiency is higher with only a small decrease in overall pumping intensity due to absorption by the reflector. An odd number of lamps places a reflector section opposite a direct emitting lamp section. Thus, an odd number of lamps should give better uniformity of pumping with respect to azimuth. Five lamps seems to be an optimum number for the larger diameter rubies. For a small diameter oscillator three lamps gives better proportions, etc.

Several workers have published absorption cross sections for the excited state of ruby as a function of pump wavelength. At pump-band wavelengths the absorption cross sections of the excited state is roughly one half of the ground state absorption. At 0.25 microns the excited state absorption is two orders of magnitude greater than the pump bands. This excited state absorption convert pump light into heat when the chromium atoms relax back down to the $R_1$ excited state. Since this releaxation takes place in $10^{-11}$ seconds, this absorption does not affect the $R_1$ population, but it does deposit detrimental heat into the ruby. The 0.25 micron absorption is particularly detrimental since it will all be absorbed at the ruby surface and produce thermal stresses. Wavelengths shorter than 0.21 microns produce free charge carriers leading to the absorption of laser light, plasma formation and destruction of the ruby. For these reasons wavelengths shorter than 0.38 microns should be filtered out before they get to the ruby.

A ruby cooling fluid used in this disclosure is perfluorohexane, which boils at 57° C. All saturated perfluorocarbons transmit from 4 microns out into the ultraviolet and will therefore not be decomposed by the filtered pump light. All pump light from 0.38 microns to 4 microns not absorbed by the ruby, the UV filters, or the reflectors will eventually find its way back to the lamps and be reabsorbed. Since $n = 1.4$ for saturated fluorocarbons, $n = 1.768$ for ruby and $n = 1.925$ for yttralox, there should be reasonably good optical coupling between the ruby and the lamps.

Cooling of the Brewster angled ruby slices requires that they be held firmly but allowed to expand thermally without developing stresses. Since a glass cladding does not absorb heat like ruby does, thermal stresses will be present in that holding technique. A transparent plastic material "FEP" Teflon, a Trademarked product of DuPont Company which is a Copolymer of Hexafluoropropylene and Tetrafluoroethylene has physical and chemical properties similar to teflon and offers the best choice for a cladding material. There are techniques for coating materials with teflon at sintering temperatures around 700° F. Since the chemistry is similar, such techniques would be applicable to cladding ruby slabs with "FEP" Teflon.

It is therefore an object of this invention to provide an improved laser disc element.

It is yet a further object of this invention to provide an improved laser disc element having an unique design for stacking along with similar elements to provide an unique, simplified liquid coolant flow.

Still a further object of this invention is to provide an improved laser disc element having a cladding material transparent at laser pump frequency, and lasing frequencies to provide stress relief for thermal stresses generated in the lasing elements.

Yet a further object of this invention is to provide an improved laser disc element having a unique plastic cladding for a laser disc element designed to provide uniform flow across the disc faces and series coolant flow along a plurality of disc faces to provide a minimum thermal stress because of coolant temperatures.

And still a further object of this invention is to provide an improved laser disc element having a fluorocarbon plastic cladding for a ruby laser disc element that provides plastic flow in the fluorocarbon plastic due to thickness stresses of the laser disc element.

Other objects, advantages and novel features of the invention will become apparent from the following detailed description of the invention when considered in conjunction with the accompanying drawing wherein.

The FIGS. 1, 2, 3, 4, and 5 taken in conjunction show a first embodiment of an assembly of lasable elements mounted along a longitudinal axis 10 and more specifically they consist of the following.

Individual lasable disc elements 11, 12, 13 and 14 are shown positioned along axis 10 at a pre-determined angle represented by 15. Depending upon the composition of the lasable elements and the liquid coolant hereinafter described, this angle can vary from zero to the Brewster angle for the lasable material.

Figure 4:
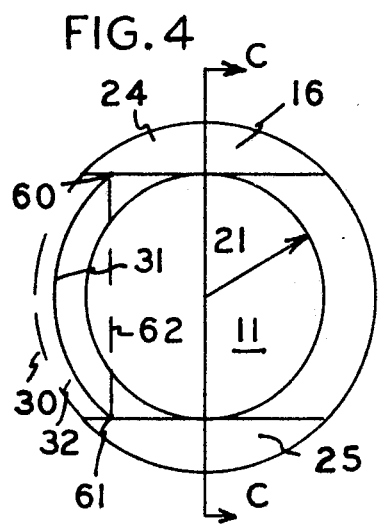
FIG. 4 is an end view of fluorocarbon plastic clad ruby laser disc element.
Figure 5:
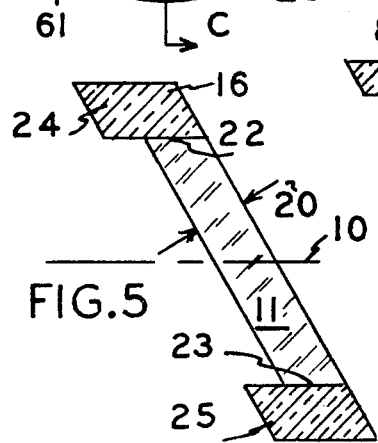
FIG. 5 is a section view along lines CC in FIG. 4.

FIGS. 4 and 5 show the specific construction of the lasable element 11 which is substantially identical to all other disc elements 12, 13 and 14. Surrounding the element 11 is a cladding material 16 which in this case is fluorocarbon plastic and on the other elements as shown 17, 18, and 19 which has a unique configuration.

Lasable element 11 has a thickness designated as 20 and a radius 21. In the embodiment shown it should be noted that faces 22 and 23 of the disc elements are substantially at the Brewster angle for the material, in this case ruby.

Figure 3:
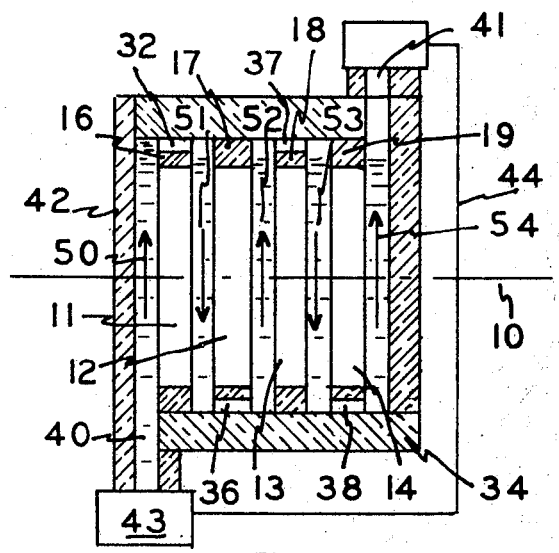
FIG. 3 is a section view along lines BB in FIG. 1.

The cladding material 16 surrounding the entire disc material at a thickness 20 and has upper and lower extensions 24 and 25 which provides spacing between disc elements when they are stacked along axis 10. Additionally there is shown in FIG. 4, a portion of the cladding material removed, or never casted, which is the area shown between the dash lines 30 and cladding outer circumference 31 which is designated as a void or recess 32. When the disc element is assembled in the total assembly as shown in FIG. 3, portion 32 leaves a void in conjunction with a cylindrical holding element 34 to allow for the passage of coolant in a pre-determined manner.

Similar recessed portions of the cladding material 36, 37 and 38 are provided on disc elements 12, 13 and 14. Somewhat schematically shown is an inlet port 40 and an outlet port 41 which are provided for flow of coolant liquid shown filling all of the space between the disc elements.

Block 43 represents a pump which is coupled via line 44 to the exit port which represents a means for return flow. Of course it should be noted that cooling of the coolant liquid 42 would be provided in such a system but a detailed description is not necessary for an understanding of this invention.

Arrows 50, 51, 52, 53, and 54 show the direction of liquid flow which is provided by the unique construction of the disc and cladding elements. The discs are stacked along axis 10 so that the recessed portion or voids 32, 36, 37, and 38 are 180° or on alternate sides. This unique arrangement allows for a series type of coolant flow past the disc elements and depending upon design requirements provides a maximum of coolant and a minimum of temperature gradient across the disc due to differences in coolant temperatures. In other words the coolant adjacent 14 is warmer than the coolant adjacent 11 and the temperature gradient between liquid flowing represented by arrows 53 and 54 adjacent to faces of disc 14 has a minimum thermal differential and therefore the coolant introduces a minimum of thermal stress. If the same amount of heating were to be removed in a parallel arrangement then the coolant might well introduce greater thermal stress than are allowed.

FIG. 5 shows the configuration of the recessed portion which is designed to provide a minimum turbulence and at the same time accomplish the desired results. This is accomplished by having the distance along the circumference of the cladding material 16 represented by line 31 determined by a chord from point 60 and 61 represented by line 62.

This line is equal to the diameter of a face of the disc 11.

Figure 1:
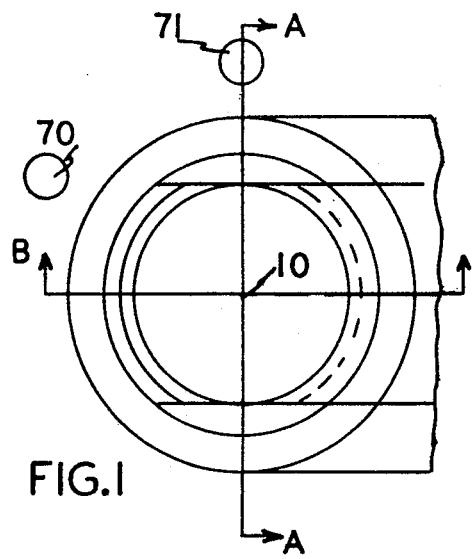
FIG. 1 is an end view of one embodiment of the invention.
Figure 2:
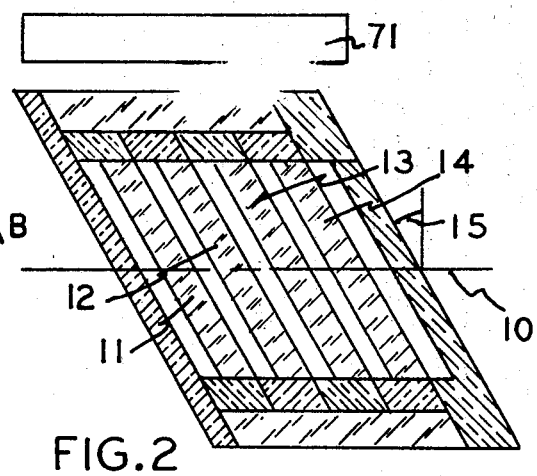
FIG. 2 is a section view along lines AA in FIG. 1.
Figure 6:
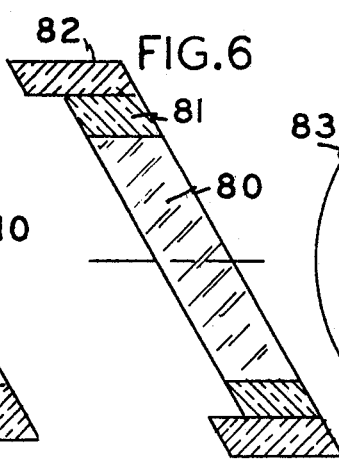
FIG. 6 is a side view of a second embodiment of the invention.

In FIG. 1, flash lamps 70 and 71 are shown to schematically position to the stack of lasable elements within a system. It should be noted that FIG. 6 shows a second embodiment of the invention having a lasable disc element 80, a cladding element 81 and an outer transparent holding element 82. Such construction is desired if it is desired to provide a plurality of stacking elements which would incorporate housing element 34 in sections.

Figure 7:
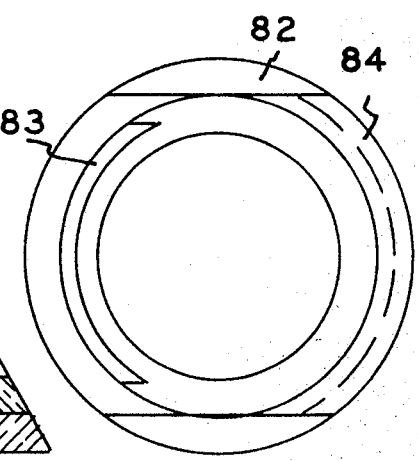
FIG. 7 is an end view of the laser disc element in FIG. 6.

FIG. 7 which is an end view of such construction, shows the removed portion 83 which provides a passage for the liquid. Dash line 84 represents an alternate construction wherein the liquid flow would be thru the outer portion of element 82. In this construction, the outer element 82, could be a sturdy element such as glass and element 81, a plastic element such as a solid perfluorocarbon allows thermal expansion by the laser element to be absorbed in the plastic element by plastic flow and thermal stress in element 80 is relieved.

A construction such as 84 would mount the lasable element 80 in the center and allow uniform plastic flow of cladding 81 which would tend to keep the disc coolant aligned to a higher degree. Obviously many modifications and variations of the present invention are possible in the light of the above teachings. It is therefore to be understood that within the scope of the appended claims the invention may be practiced otherwise than as specifically described.

I claim:

1. An assembly of lasable elements alignable along an axis comprising;
   a. a plurality of cylindrical lasable elements;
   b. a plastic cladding material consisting of a transparent plastic about each of said elements;
   c. a means about each of said cladded elements for holding said element and for aligning said lasable element along said axis at a pre-determined angle, said plastic material having properties whereby heating of the lasable element due to pumping and lasing which causes said lasable element to have thermal stresses therein allows said element to expand causing plastic flow of said plastic cladding and reduces the thermal stress within the lasable element.

2. The device of claim 1 wherein said plastic cladding material is a Copolymer of Hexafluoropropylene and Tetrafluoroethylene.

3. The device of claim 2 wherein said lasable elements are substantially disc shaped having a diameter substantially larger than the thickness of said disc.

4. The device of claim 3 wherein portions of said cladding material have a length greater than said thickness of said lasable element to provide spacing between said elements when aligned in said assembly along said axis for allowing the flow of a cooling liquid past the faces of said elements.

5. The device of claim 4 wherein a portion of said cladding material is removed about the outer circumference of said cladding material to allow for passage of cooling fluid past one face of the lasable element to the other face of said lasable element to provide a series type flow of said cooling liquid past the individual lasable elements.

6. The device of claim 5 wherein the protion of removed circumference of said cladding material is at least a chord subtended by an angle equal to the diameter of said disc element.

7. The device of claim 6 wherein the portion of the cladding to provide spacing between elements consists of two substantially equal parts at opposite sides of said element and defined therebetween a channel to allow cooling liquid to flow past the entire face of said disc elements.

8. The device of claim 7 wherein alternate ones of said lasable elements have cladding removed from a portion of the circumference of cladding and the removed portion is substantially 180° from adjacent elements so that coolant liquid flow is in a series arrangement past faces of said lasable elements.

* * * * *